US008298314B2

(12) United States Patent
Li

(10) Patent No.: US 8,298,314 B2
(45) Date of Patent: Oct. 30, 2012

(54) SILVER NANOPARTICLES AND PROCESS FOR PRODUCING SAME

(75) Inventor: Yuning Li, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 298 days.

(21) Appl. No.: 12/193,203

(22) Filed: Aug. 18, 2008

(65) Prior Publication Data
US 2010/0037731 A1    Feb. 18, 2010

(51) Int. Cl.
*B22F 9/24* (2006.01)
(52) U.S. Cl. .......................................... 75/371; 977/896
(58) Field of Classification Search ...................... 75/371
See application file for complete search history.

(56) References Cited

U.S. PATENT DOCUMENTS

| | | | |
|---|---|---|---|
| 6,621,099 | B2 | 9/2003 | Ong et al. |
| 6,770,904 | B2 | 8/2004 | Ong et al. |
| 6,878,184 | B1 | 4/2005 | Rockenberger et al. |
| 6,949,762 | B2 | 9/2005 | Ong et al. |
| 7,270,694 | B2 | 9/2007 | Li et al. |
| 7,306,969 | B2 | 12/2007 | Wu et al. |
| 7,744,834 | B2 * | 6/2010 | Lee et al. .......................... 423/23 |
| 2006/0065075 | A1 * | 3/2006 | Chang et al. ..................... 75/371 |
| 2006/0254387 | A1 * | 11/2006 | Lee et al. .......................... 75/252 |
| 2007/0003603 | A1 * | 1/2007 | Karandikar et al. ........... 424/443 |
| 2007/0034052 | A1 * | 2/2007 | Vanheusden et al. ............ 75/362 |
| 2008/0011125 | A1 * | 1/2008 | Shirata et al. ..................... 75/255 |
| 2009/0029148 | A1 * | 1/2009 | Hashimoto et al. ............ 428/323 |

FOREIGN PATENT DOCUMENTS

| | | |
|---|---|---|
| CA | 2589618 | 3/2006 |
| CA | 2521686 | 4/2006 |
| EP | 1561530 A | 8/2005 |
| EP | 1646095 A | 4/2006 |
| JP | 2004183009 A | 7/2004 |
| JP | 2006-219693 | 8/2006 |

OTHER PUBLICATIONS

"Novel preparation of monodispersed silver nanoparticles via amine adducts derived from insoluble silver myristate in tertiary alkylamine," Mari Yamamoto et al., J. Mater. Chem., 2003 13, 2064-2065.
"Organic Thin Film Transistors for Large Area Electronics," Christos D. Dimitrakopoulos et al., Adv. Mater. 2002, 14, No. 2, Jan. 16, pp. 99-117.
European Search Report issued Jan. 14, 2010.

* cited by examiner

*Primary Examiner* — George Wyszomierski
(74) *Attorney, Agent, or Firm* — Fay Sharpe LLP

(57) ABSTRACT

Processes for producing silver nanoparticles are disclosed. A reaction mixture comprising a silver compound, a carboxylic acid, an amine compound, and an optional solvent is optionally heated. A hydrazine compound is then added and the mixture is further reacted to produce the silver nanoparticles.

24 Claims, 5 Drawing Sheets

SILVER NANOPARTICLES AND PROCESS FOR PRODUCING SAME

CROSS REFERENCE TO RELATED PATENTS AND APPLICATIONS

Reference is made to the eight following related and commonly assigned patent applications, all of which are hereby fully incorporated by reference herein:

Yiliang Wu et al., U.S. application Ser. No. 10/733,136, filed Dec. 11, 2003, titled "NANOPARTICLE DEPOSITION PROCESS."

Yuning Li et al., U.S. Pat. No. 7,270,694, titled "STABILIZED SILVER NANOPARTICLES AND THEIR USE."

Yiliang Wu et al., U.S. Pat. No. 7,306,969, titled "METHODS TO MINIMIZE CONTACT RESISTANCE."

Yuning Li et al., U.S. application Ser. No. 11/543,661, filed Oct. 5, 2006, titled "SILVER-CONTAINING NANOPARTICLES WITH REPLACEMENT STABILIZER."

Yuning Li et al., U.S. application Ser. No. 11/611,228, filed Dec. 15, 2006, titled "DEVICES CONTAINING ANNEALED STABILIZED SILVER NANOPARTICLES."

Yuning Li et al., U.S. application Ser. No. 11/837,023, filed Aug. 10, 2007, titled "STABILIZED SILVER NANOPARTICLES AND THEIR USE."

Yuning Li et al., U.S. application Ser. No. 11/946,923, filed Nov. 29, 2007, titled "SILVER NANOPARTICLE COMPOSITIONS."

Yuning Li et al., U.S. application Ser. No. 12/193,225, filed concurrently, titled "METHODS FOR PRODUCING CARBOXYLIC ACID STABILIZED SILVER NANOPARTICLES".

BACKGROUND

Disclosed herein, in various embodiments, are stable, high performing silver nanoparticle compositions as well as processes and devices for making and/or using the same.

Fabrication of electronic circuit elements using liquid deposition techniques may be beneficial as such techniques provide potentially low-cost alternatives to conventional mainstream amorphous silicon technologies for electronic applications such as thin film transistors (TFTs), light-emitting diodes (LEDs), RFID tags, photovoltaics, etc. However, the deposition and/or patterning of functional electrodes, pixel pads, and conductive traces, lines and tracks which meet the conductivity, processing, and cost requirements for practical applications have been a great challenge. Silver is of particular interest as conductive elements for electronic devices because silver is much lower in cost than gold and it possesses much better environmental stability than copper. There is therefore a critical need, addressed by embodiments of the present disclosure, for lower cost methods for preparing liquid processable, stable silver-containing nanoparticle compositions that are suitable for fabricating electrically conductive elements of electronic devices.

BRIEF DESCRIPTION

The present application discloses, in various exemplary embodiments, processes for preparing silver-containing nanoparticle compositions, as well as the compositions so produced. Devices which use the nanoparticle compositions, such as thin film transistors, are also disclosed.

Disclosed in embodiments is a process for producing silver nanoparticles, comprising:

forming a mixture comprising a silver compound, a carboxylic acid, an amine compound, and an optional solvent;
optionally heating the mixture;
adding a hydrazine compound to the mixture; and
reacting the mixture to form silver nanoparticles.

The silver compound may be selected from the group consisting of silver (I) oxide, silver (II) oxide, silver acetate, silver nitrate, silver acetylacetonate, silver benzoate, silver bromate, silver bromide, silver carbonate, silver chloride, silver citrate, silver fluoride, silver iodate, silver iodide, silver lactate, silver nitrite, silver perchlorate, silver phosphate, silver sulfate, silver sulfide, and silver trifluoroacetate.

The carboxylic acid may have at least 4 carbon atoms. In some embodiments, the carboxylic acid has from 4 to about 20 carbon atoms. Alternatively, the carboxylic acid may be selected from the group consisting of butyric acid, pentanoic acid, hexanoic acid, heptanoic acid, octanoic acid, nonanoic acid, decanoic acid, undecanoic acid, dodecanoic acid, tridecanoic acid, myristic acid, pentadecanoic acid, palmitic acid, heptadecanoic acid, stearic acid, oleic acid, nonadecanoic acid, icosanoic acid, eicosenoic acid, elaidic acid, linoleic acid, and palmitoleic acid.

The amine compound may contain one, two, or more amine groups of:

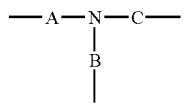

wherein A, B, and C are independently selected from hydrogen and an organic group, and at least one is an organic group.

In more specific embodiments, the amine compound is of one the formulas:

wherein $R^1$, $R^2$, $R^3$, $R^4$, and $R^5$ are independently selected from hydrogen, alkyl, aryl, substituted alkyl, and substituted aryl; wherein at least one of $R^1$, $R^2$, and $R^3$ is not hydrogen; and $R^5$ cannot be hydrogen. The amine compound may be selected from the group consisting of propylamine, butylamine, pentylamine, hexalamine, heptylamine, octylamine, nonylamine, decylamine, undecylamine, dodecylamine, tridecylamine, tetradecylamine, pentadecylamine, hexadecylamine, heptadecylamine, octadecylamine, N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, methylpropylamine, ethylpropylamine, propylbutylamine, ethylbutylamine, ethylpentylamine, propylpentylamine, butylpentylamine, triethylamine, tripropylamine, tributylamine, tripentylamine, trihexylamine, triheptylamine, trioctylamine, 1,2-ethylenediamine, N,N,N',N'-tetramethylethylenediamine, propane-1,3-diamine, N,N,N', N'-tetramethylpropane-1,3-diamine, butane-1,4-diamine, and N,N,N',N'-tetramethylbutane-1,4-diamine.

The hydrazine compound may be of the formula:

wherein $R^6$, $R^7$, $R^8$ and $R^9$ are independently selected from hydrogen, alkyl, and aryl; and wherein at least one of $R^6$, $R^7$, $R^8$ and $R^9$ is not hydrogen. The hydrazine compound may be of the formula $R^6R^7N-NH_2$. The hydrazine compound, in some specific embodiments, is phenylhydrazine.

The molar ratio of carboxylic acid to silver compound may be from about 0.05 to about 10. The molar ratio of amine compound to silver compound may be from about 0.1 to about 1000. The molar ratio of hydrazine compound to silver compound may be from about 0.2 to about 2.0.

The mixture may be heated at a temperature of from about 25° C. to about 200° C. The mixture may be heated for a period of up to about 120 minutes.

The mixture may be reacted at a temperature of from about 25° C. to about 200° C. The mixture may be reacted for a period of from about 5 minutes to about 5 hours.

The resulting nanoparticles may have an average diameter of from about 0.5 nanometers to about 1000 nanometers.

The process may further comprise separating the silver nanoparticles from the mixture with a first non-solvent; and washing the silver nanoparticles with a second non-solvent.

The non-solvents may comprise methanol, ethanol, propanol, isopropanol, acetone, or N,N-dimethylformamide.

The silver nanoparticles may have a particle size distribution width of about 30 nanometers or less.

Disclosed in other embodiments is a process for producing silver nanoparticles with a narrow particle size distribution, comprising:

forming a mixture comprising a silver compound, a carboxylic acid, and a chelating diamine compound;

optionally heating the mixture;

adding a hydrazine compound to the mixture; and reacting the mixture to form silver nanoparticles;

wherein the silver nanoparticles have a particle size distribution width of about 30 nanometers or less.

The chelating diamine compound may be of the formula:

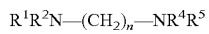

$R^1R^2N—(CH_2)_n—NR^4R^5$ wherein $R^1$, $R^2$, $R^4$, and $R^5$ are independently selected from hydrogen, alkyl, aryl, substituted alkyl, and substituted aryl; and n is from 1 to 4. In particular embodiments, the chelating diamine compound is tetramethylethylenediamine. The silver nanoparticles may have an average diameter of from about 1 to about 50 nanometers.

Silver nanoparticles resulting from such processes are also disclosed. Also disclosed are thin-film transistors produced by depositing the silver nanoparticles and then heating.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
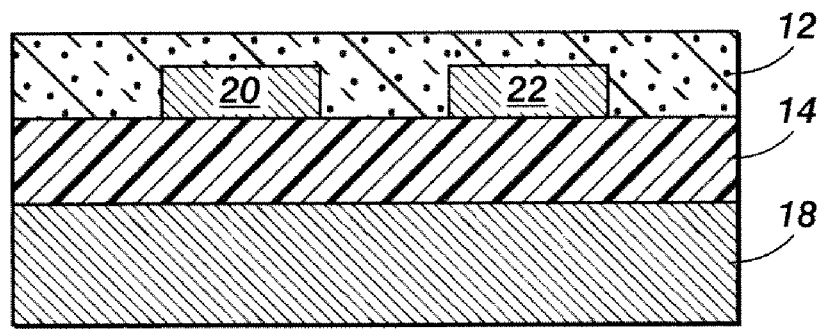
FIG. 1 represents a first embodiment of a thin film transistor containing nanoparticles of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The term "nano" as used in "silver nanoparticles" indicates a particle size of less than about 1000 nm. In embodiments, the silver-containing nanoparticles have a particle size of from about 0.5 nm to about 1000 nm, from about 1 nm to about 500 nm, from about 1 nm to about 100 nm, and particularly from about 1 nm to about 20 nm. The particle size is defined herein as the average diameter of the silver particles, excluding the stabilizer, as determined by TEM (transmission electron microscopy).

The processes of the present disclosure produce silver nanoparticles. The processes comprise (a) forming a mixture comprising a silver compound, a carboxylic acid, an amine compound, and optional solvent; (b) optionally heating the mixture; (c) adding a hydrazine compound to the mixture; and (d) reacting the mixture to form silver nanoparticles.

The silver compound comprises silver(I) or silver(II). Exemplary silver compounds include silver (I) oxide, silver (II) oxide, silver acetate, silver nitrate, silver acetylacetonate, silver benzoate, silver bromate, silver bromide, silver carbonate, silver chloride, silver citrate, silver fluoride, silver iodate, silver iodide, silver lactate, silver nitrite, silver perchlorate, silver phosphate, silver sulfate, silver sulfide, silver trifluoroacetate, and the like, or mixtures thereof.

The carboxylic acid used in the mixture has at least 4 carbon atoms. In further specific embodiments, the carboxylic acid has from 4 to about 20 carbon atoms. Exemplary carboxylic acids include butyric acid, pentanoic acid, hexanoic acid, heptanoic acid, octanoic acid, nonanoic acid, decanoic acid, undecanoic acid, dodecanoic acid, tridecanoic acid, myristic acid, pentadecanoic acid, palmitic acid, heptadecanoic acid, stearic acid, oleic acid, nonadecanoic acid, icosanoic acid, eicosenoic acid, elaidic acid, linoleic acid, and palmitoleic acid.

The amine compound functions as a complexing agent. The amine compound may be any primary, secondary, or tertiary amine. The amine compound can be a monoamine, diamine, or polyamine.

More specifically, the amine compound may contain one, two, or more amine groups of:

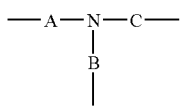

wherein A, B, and C are independently selected from hydrogen and an organic group, and at least one is an organic group. When the tertiary amine contains more than one such amine group, the nitrogen atoms are not directly bonded to each other. Exemplary organic groups include alkyl, aryl, substituted alkyl, and substituted aryl.

In other embodiments, the amine compound is described by one of the formulas:

$NR^1R^2R^3$ or $R^1R^2N-R^5-NR^3R^4$ wherein $R^1$, $R^2$, $R^3$, $R^4$, and $R^5$ are independently selected from hydrogen, alkyl, aryl, substituted alkyl, and substituted aryl; wherein at least one of $R^1$, $R^2$, and $R^3$ is not hydrogen; and $R^5$ cannot be hydrogen. Generally, the alkyl group will have from 1 to about 18 carbon atoms and the aryl groups will have from 6 to about 20 carbon atoms. The alkyl and aryl groups may be substituted with groups such as halogen, hydroxyl, nitro ($-NO_2$), alkoxy, mercapto ($-SH$), etc. Exemplary amine compounds include propylamine, butylamine, pentylamine, hexalamine, heptylamine, octylamine, nonylamine, decylamine, undecylamine, dodecylamine, tridecylamine, tetradecylamine, pentadecylamine, hexadecylamine, heptadecylamine, octadecylamine, N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, methylpropylamine, ethylpropylamine, propylbutylamine, ethylbutylamine, ethylpentylamine, propylpentylamine, butylpentylamine, triethylamine, tripropylamine, tributylamine, tripentylamine, trihexylamine, triheptylamine, trioctylamine, 1,2-ethylenediamine, N,N,N',N'-tetramethylethylenediamine, propane-1,3-diamine, N,N,N',N'-tetramethylpropane-1,3-diamine, butane-1,4-diamine, and N,N,N',N'-tetramethylbutane-1,4-diamine, and the like, or mixtures thereof.

In embodiments, the molar ratio of carboxylic acid to silver compound is from about 0.05 to about 10. In more specific embodiments, the molar ratio of carboxylic acid to silver compound is from about 0.1 to about 10, including from about 0.1 to 1.

In embodiments, the molar ratio of amine compound to silver compound is from about 0.1 to about 1000. In more specific embodiments, the molar ratio of amine compound to silver compound is from about 0.2 to about 10, including from about 0.4 to 4.0.

If desired, a solvent may be added to the initial mixture. The solvent may be an organic solvent such as pentane, hexane, cyclohexane, heptane, octane, nonane, decane, undecane, dodecane, tridecane, tetradecane, toluene, xylene, mesitylene, tetrahydrofuran, chlorobenzene, dichlorobenzene, trichlorobenzene; nitrobenzene, cyanobenzene, and the like, or mixtures thereof.

The mixture of silver compound, carboxylic acid, amine compound, and optional solvent can optionally be heated. Heating may be necessary to dissolve the silver compound and homogenize the mixture. If the silver was not dissolved, then as the process continued, the silver compound would be reduced so that silver nanoparticles would not be stabilized and would form insoluble aggregates.

The mixture may be heated at a temperature of from about 25° C. to about 200° C. In more specific embodiments, the mixture is heated to a temperature of from about 25° C. to about 150° C., or from about 50° C. to about 100° C.

The mixture may be heated for a period of up to about 120 minutes. In more specific embodiments, heated for a period of from about 1 minute to about 60 minutes. Generally, the mixture is heated at atmospheric pressure.

Next, a hydrazine compound is added to the mixture. As used herein, the term "hydrazine compound" refers to, for example, substituted hydrazines or their suitable hydrates or salts. The substituted hydrazine may contain from about 1 carbon atom to about 30 carbon atoms, from about 1 carbon atom to about 25 carbon atoms, from about 2 to about 20 carbon atoms and from about 2 to about 16 carbon atoms. In embodiments, the substituted hydrazine may include, for example, a hydrocarbyl hydrazine, a hydrazide, a carbazate and a sulfonohydrazide.

The use of a hydrazine compound as a reducing agent may have a number of advantages, such as, for example, 1) having solubility in water, polar or non-polar organic solvents depending on the substitution; 2) having strong to weak reducing ability depending on the substitution; and 3) nonexistence of non-volatile metal ions as in other reducing agents such as, for example, sodium hydroboride, which would facilitate the removal of by-product or unreacted reducing agent.

Examples of hydrocarbyl hydrazine include, for example, $RNHNH_2$, $RNHNHR'$ and $RR'NNH_2$, where one nitrogen atom is mono- or di-substituted with R or R', and the other nitrogen atom is optionally mono- or di-substituted with R or R', where each R or R' is a hydrocarbon group. Examples of hydrocarbyl hydrazines include, for example, methylhydrazine, tert-butylhydrazine, 2-hydroxyethylhydrazine, benzylhydrazine, phenylhydrazine, tolylhydrazine, bromophenyihydrazine, chlorophenylhydrazine, nitrophenylhydrazine, 1,1-dimethylhydrazine, 1,1-diphenylhydrazine, 1,2-diethylhydrazine, and 1,2-diphenylhydrazine.

Unless otherwise indicated, in identifying the substituents for R and R' of the various hydrazine compounds, the phrase "hydrocarbon group" encompasses both unsubstituted hydrocarbon groups and substituted hydrocarbon groups. Unsubstituted hydrocarbon groups may include any suitable substituent such as, for example, a hydrogen atom, a straight chain or branched alkyl group, a cycloalklyl group, an aryl group, an alkylaryl group, arylalkyl group or combinations thereof. Alkyl and cycloalkyl substituents may contain from about 1 to about 30 carbon atoms, from about 5 to 25 carbon atoms and from about 10 to 20 carbon atoms. Examples of alkyl and cycloalkyl substituents include, for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, or eicosanyl, and combinations thereof. Aryl group substituents may contain from about 6 to about 48 carbon atoms, from about 6 to about 36 carbon atoms, from about 6 to about 24 carbon atoms. Examples of aryl substituents include, for example, phenyl, methylphenyl (tolyl), ethylphenyl, propylphenyl, butylphenyl, pentylphenyl, hexylphenyl, heptylphenyl, octylphenyl, nonylphenyl, decylphenyl, undecylphenyl, dodecylphenyl, tridecylphenyl, tetradecylphenyl, pentadecylphenyl, hexadecylphenyl, heptadecylphenyl, octadecylphenyl, or combinations thereof. Substituted hydrocarbon groups may be the unsubstituted hydrocarbon groups described herein which are substituted with one, two or more times with, for example, a halogen (chlorine, fluorine, bromine and iodine), a nitro group, a cyano group, an alkoxy group (methoxyl, ethoxyl and propoxy), or heteroaryls. Examples of heteroaryl groups may include thienyl, furanyl, pyridinyl, oxazoyl, pyrroyl, triazinyl, imidazoyl, pyrimidinyl, pyrazinyl, oxadiazoyl, pyrazoyl, triazoyl, thiazoyl, thiadiazoyl, quinolinyl, quinazolinyl, naphthyridinyl, carbazoyl, or combinations thereof.

Examples of hydrazine compounds may include, for example, hydrazides, $RC(O)NHNH_2$ and $RC(O)NHNHR'$ and $RC(O)NHNHC(O)R$, where one or both nitrogen atoms are substituted by an acyl group of formula $RC(O)$, where each R is independently selected from hydrogen and a hydrocarbon group, and one or both nitrogen atoms are optionally mono- or di-substituted with R', where each R' is an independently selected hydrocarbon group. Examples of hydrazide may include, for example, formic hydrazide, acethydrazide, benzhydrazide, adipic acid dihydrazide, carbohydrazide, butanohydrazide, hexanoic hydrazide, octanoic hydrazide, oxamic acid hydrazide, maleic hydrazide, N-methylhydrazinecarboxamide, and semicarbazide.

Examples of hydrazine compounds may include, for example, carbazates and hydrazinocarboxylates, for example, $ROC(O)NHNHR'$, $ROC(O)NHNH_2$ and $ROC(O)NHNHC(O)OR$, where one or both nitrogen atoms are substituted by an ester group of formula $ROC(O)$, where each R is independently selected from hydrogen and a hydrocarbon group, and one or both nitrogen atoms are optionally mono- or di-substituted with R', where each R' is an independently selected hydrocarbon group. Examples of carbazate may include, for example, methyl carbazate (methyl hydrazinocarboxylate), ethyl carbazate, butyl carbazate, benzyl carbazate, and 2-hydroxyethyl carbazate.

Examples of sulfonohydrazides include, for example, $RSO_2NHNH_2$, $RSO_2NHNHR'$, and $RSO_2NHNHSO_2R$, where one or both nitrogen atoms are substituted by a sulfonyl group of formula $RSO_2$, where each R is independently selected from hydrogen and a hydrocarbon group, and one or both nitrogen atoms are optionally mono- or di-substituted with R', where each R' is an independently selected hydrocarbon group. Examples of sulfonohydrazide may include, for example, methane sulfonohydrazide, benzene sulfonohydrazine, 2,4,6-trimethylbenzene sulfonohydrazide, and p-toluenesulfonohydrazide. Other hydrazine compounds may include, for example, aminoguanidine, thiosemicarbazide, methyl hydrazinecarbimidothiolate, and thiocarbohydrazide.

In embodiments, the hydrazine compound has the formula:

wherein $R^6$, $R^7$, $R^8$ and $R^9$ are independently selected from hydrogen, alkyl, and aryl; and wherein at least one of $R^6$, $R^7$, $R^8$ and $R^9$ is not hydrogen. In more specific embodiments, the hydrazine compound is of the formula $R^6R^7N-NH_2$. Exemplary hydrazine compounds include methylhydrazine, tert-butylhydrazine, 2-hydroxyethylhydrazine, benzylhydrazine, phenylhydrazine, tolylhydrazine, bromophenylhydrazine, chlorophenylhydrazine, and nitrophenylhydrazine.

In embodiments, the molar ratio of hydrazine compound to silver compound is from about 0.2 to about 2.0.

Next, the mixture including a silver compound, a carboxylic acid, an amine compound, and an optional solvent is reacted with the hydrazine compound to form silver nanoparticles. Generally, the mixture is reacted at an elevated temperature and may also be reacted with agitation, such as stirring. The mixture may be reacted at a temperature of from about 25° C. to about 200° C. In more specific embodiments, the mixture is heated to a temperature of from about 50° C. to about 100° C.

The mixture may be reacted for a period of from about 5 minutes to about 5 hours. In more specific embodiments, the mixture is heated for a period of from about 10 minutes to about 2 hours. Generally, the mixture is reacted at atmospheric pressure.

The resulting nanoparticles have an average diameter of from about 0.5 nanometers to about 1000 nanometers. In more specific embodiments, the nanoparticles have an average diameter of from about 1 nanometer to about 100 nanometers.

As desired, the silver nanoparticles may be separated from the reaction mixture by using a non-solvent, i.e. a liquid in which the silver nanoparticles are not soluble. The silver nanoparticles may then be washed with a non-solvent. Exemplary non-solvents include methanol, ethanol, propanol, isopropanol, acetone, acetonitrile, N,N-dimethylformamide, dimethyl sulfoxide, etc.

If a chelating diamine compound is used, the resulting silver nanoparticles may have a narrow particle size distribution width. Exemplary chelating diamine compounds have the formula:

wherein $R^1$, $R^2$, $R^4$, and $R^5$ are independently selected from hydrogen, alkyl, aryl, substituted alkyl, and substituted aryl; and n is from 1 to 4. In specific embodiments, the chelating diamine compound is N,N,N',N'-tetramethylethylenediamine, or TMEDA.

The particle size distribution width refers to the difference between the diameter of the largest nanoparticle and the diameter of the smallest nanoparticle, or the range between the smallest and largest nanoparticles. In embodiments, the particle size distribution width of the silver nanoparticles is about 30 nanometers or less. In more specific embodiments, the particle size distribution width is from about 10 to 30 nanometers, or from about 10 to 25 nanometers. In addition, the silver nanoparticles are generally small. In embodiments, the silver nanoparticles may have an average diameter of from about 1 nanometer to about 50 nanometers.

The silver nanoparticles produced using the processes of the present disclosure comprise carboxylic acid as a stabilizer on the surface of the silver nanoparticles. Besides the carboxylic acid stabilizer, the silver nanoparticles may or may not comprise amine compound on the surface of the silver nanoparticles. The processes of the present disclosure allow for an inexpensive, one-step process of making silver nanoparticles. In contrast, prior methods required multiple steps involving the formation of an amine-stabilized silver nanoparticle, then replacing the amine with a carboxylic acid.

In embodiments, the silver-containing nanoparticles are composed of elemental silver or a silver composite. Besides silver, the silver composite may include either or both of (i) one or more other metals and (ii) one or more non-metals. Suitable other metals include, for example, Al, Au, Pt, Pd, Cu, Co, Cr, In, and Ni, particularly the transition metals, for example, Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include, for example, Si, C, and Ge. The various components of the silver composite may be present in an amount ranging for example from about 0.01% to about 99.9% by weight, particularly from about 10% to about 90% by weight. In embodiments, the silver composite is a metal alloy composed of silver and one, two or more other metals, with silver comprising, for example, at least about 20% of the nanoparticles by weight, particularly greater than about 50% of the nanoparticles by weight.

In embodiments, further processing of the silver nanoparticles may occur such as, for example, making them compatible with a liquid deposition technique (e.g., for fabricating an electronic device). Such further processing of the composition may be, for instance, dissolving or dispersing the silver nanoparticles in an appropriate liquid.

The liquid that can be used to disperse or dissolve silver nanoparticles to form a silver nanoparticle composition includes organic liquids or water. Exemplary organic liquids include hydrocarbon solvents such as pentane, hexane, cyclohexane, heptane, octane, nonane, decane, undecane, dodecane, tridecane, tetradecane, toluene, xylene, mesitylene, and the like; alcohols such as butanol, pentanol, hexanol, heptanol, octanol, and the like; tetrahydrofuran; chlorobenzene; dichlorobenzene; trichlorobenzene; nitrobenzene; cyanobenzene; acetonitrile; and mixtures thereof. One, two, three or more liquids may be used. In embodiments where two or more solvents are used, each solvent may be present at any suitable volume ratio or molar ratio such as for example from about 99:1 to about 1:99.

The fabrication of conductive elements from the silver nanoparticles can be carried out in embodiments using any suitable liquid deposition technique including i) printing such as screen/stencil printing, stamping, microcontact printing, ink jet printing and the like, and ii) coating such as spin-coating, dip coating, blade coating, casting, dipping, and the like. The deposited silver nanoparticles at this stage may or may not exhibit electrical conductivity.

Heating the deposited nanoparticles at a temperature of below about 300° C., preferably at or below about 250° C. causes them to coalesce to form electrically conductive layers which are suitable for use as conductive elements in electronic devices. The heating is performed for a time ranging from for example about one minute to about 10 hours, particularly from about 5 minutes to about 1 hour. The heating can be done at a temperature of from about 100° C. to about 300° C. In more specific embodiments, the heating is performed at a temperature of from about 150° C. to about 200° C. or from about 170° C. to about 190° C.

The conductivity of the resulting silver-containing elements produced by heating the deposited silver nanoparticles is, for example, at least one thousand S/cm. In other embodiments, the conductivity is at least ten thousand S/cm as measured by four-probe method.

The resulting conductive elements can be used as conductive electrodes, conductive pads, conductive lines, conductive tracks, and the like in electronic devices such as thin film transistor, organic light emitting diodes, RFID (radio frequency identification) tags, photovoltaic, and other electronic devices which require conductive elements or components.

In FIG. 1, there is schematically illustrated a thin film transistor ("TFT") configuration 10 comprised of a heavily n-doped silicon wafer 18 which acts as both a substrate and a gate electrode, a thermally grown silicon oxide insulating dielectric layer 14 on top of which are deposited two metal contacts, source electrode 20 and drain electrode 22. Over and between the metal contacts 20 and 22 is a semiconductor layer 12 as illustrated herein.

Figure 2:
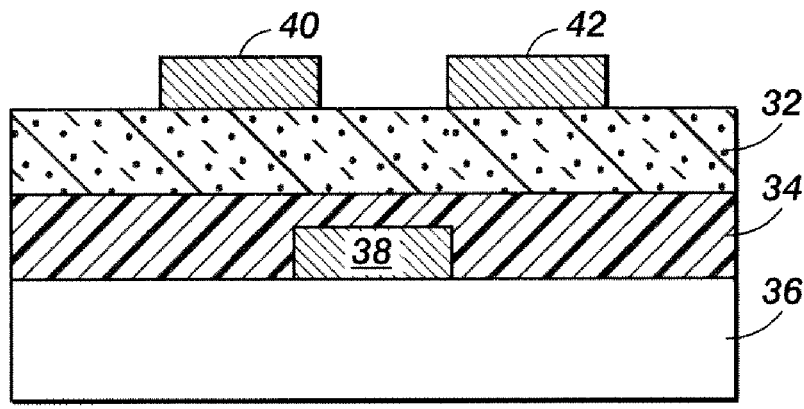
FIG. 2 represents a second embodiment of a thin film transistor containing nanoparticles of the present disclosure.

FIG. 2 schematically illustrates another TFT configuration 30 comprised of a substrate 36, a gate electrode 38, a source electrode 40 and a drain electrode 42, an insulating dielectric layer 34, and a semiconductor layer 32.

Figure 3:
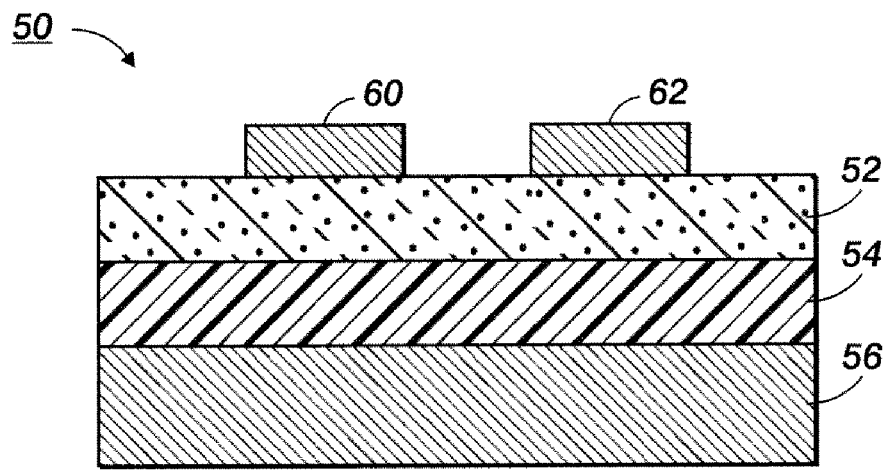
FIG. 3 represents a third embodiment of a thin film transistor containing nanoparticles of the present disclosure.

FIG. 3 schematically illustrates a further TFT configuration 50 comprised of a heavily n-doped silicon wafer 56 which acts as both a substrate and a gate electrode, a thermally grown silicon oxide insulating dielectric layer 54, and a semiconductor layer 52, on top of which are deposited a source electrode 60 and a drain electrode 62.

Figure 4:
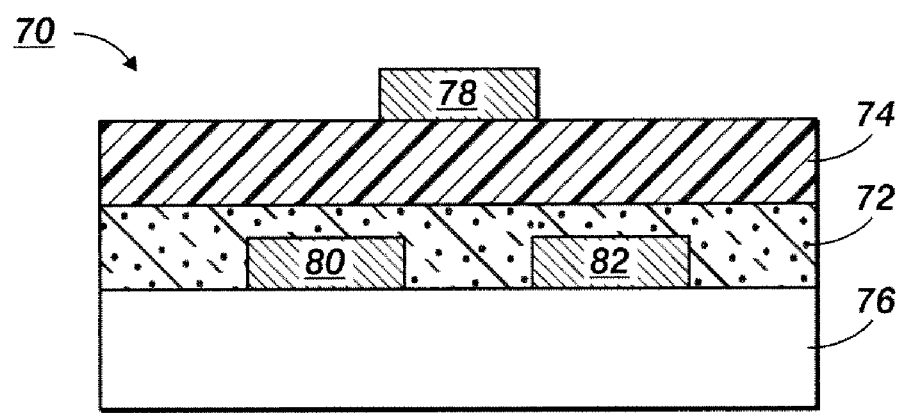
FIG. 4 represents a fourth embodiment of a thin film transistor containing nanoparticles of the present disclosure.

FIG. 4 schematically illustrates an additional TFT configuration 70 comprised of substrate 76, a gate electrode 78, a source electrode 80, a drain electrode 82, a semiconductor layer 72, and an insulating dielectric layer 74.

The substrate may be composed of, for instance, silicon, glass plate, plastic film or sheet, paper, or fiber. For structurally flexible devices, plastic substrate, such as for example polyester, polycarbonate, polyimide sheets and the like may be used. The thickness of the substrate may be from amount 10 micrometers to over 10 millimeters with an exemplary thickness being from about 50 micrometers to about 2 millimeters, especially for a flexible plastic substrate and from about 0.4 to about 10 millimeters for a rigid substrate such as glass or silicon.

The gate electrode, the source electrode, and the drain electrode are fabricated by embodiments of the present disclosure. The thickness of the gate electrode layer ranges for example from about 10 to about 2000 nm. Typical thicknesses of source and drain electrodes are, for example, from about 40 nm to about 1 micrometer with the more specific thickness being about 60 to about 400 nm.

The insulating dielectric layer generally can be an inorganic material film or an organic polymer film. Illustrative examples of inorganic materials suitable as the insulating layer include silicon oxide, silicon nitride, aluminum oxide, barium titanate, barium zirconium titanate and the like; illustrative examples of organic polymers for the insulating layer include polyesters, polycarbonates, poly(vinyl phenol), polyimides, polystyrene, poly(methacrylate)s, poly(acrylate)s, epoxy resin and the like. The thickness of the insulating layer is, for example from about 10 nm to about 500 nm depending on the dielectric constant of the dielectric material used. An exemplary thickness of the insulating layer is from about 100 nm to about 500 nm. The insulating layer may have a conductivity that is for example less than about $10^{12}$ S/cm.

Situated, for example, between and in contact with the insulating layer and the source/drain electrodes is the semiconductor layer wherein the thickness of the semiconductor layer is generally, for example, about 10 nm to about 1 micrometer, or about 40 to about 100 nm. Any semiconductor material may be used to form this layer. Exemplary semiconductor materials include regioregular polythiophene, oligthiophene, pentacene, and the semiconductor polymers disclosed in U.S. Pat. Nos. 6,621,099; 6,770,904; and 6,949,762; and "Organic Thin Film Transistors for Large Area Electronics" by C. D. Dimitrakopoulos and P. R. L. Malenfant, *Adv. Mater.*, Vol. 12, No. 2, pp. 99-117 (2002), the disclosures of which are totally incorporated herein by reference. Any suitable technique may be used to form the semiconductor layer. One such method is to apply a vacuum of about $10^{-5}$ to $10^{-7}$ torr to a chamber containing a substrate and a source vessel that holds the compound in powdered form. Heat the vessel until the compound sublimes onto the substrate. The semiconductor layer can also generally be fabricated by solution processes such as spin coating, casting, screen printing, stamping, or jet printing of a solution or dispersion of the semiconductor.

The insulating dielectric layer, the gate electrode, the semiconductor layer, the source electrode, and the drain electrode are formed in any sequence, particularly where in embodiments the gate electrode and the semiconductor layer both contact the insulating layer, and the source electrode and the drain electrode both contact the semiconductor layer. The phrase "in any sequence" includes sequential and simultaneous formation. For example, the source electrode and the drain electrode can be formed simultaneously or sequentially. The composition, fabrication, and operation of thin film transistors are described in Bao et al., U.S. Pat. No. 6,107,117, the disclosure of which is totally incorporated herein by reference. The silver nanoparticles can be deposited as a layer upon any suitable surface, such as the substrate, the dielectric layer, or the semiconductor layer.

The following examples are for purposes of further illustrating the present disclosure. The examples are merely illustrative and are not intended to limit devices made in accordance with the disclosure to the materials, conditions, or process parameters set forth therein.

EXAMPLES

Example 1

Silver acetate (0.84 grams, 5 mmol), oleic acid (2.12 grams, 7.5 mmol), and 1-butylamine (1.46 grams, 20 mmol) were mixed in 20 mL toluene and stirred at 50° C. until all solids dissolved (within 5 minutes). Phenylhydrazine (0.30 grams, 2.75 mmol) solution in toluene (5 mL) was added into the silver acetate solution drop-wise with vigorous stirring. The solution became a dark red-brown color. The solution was stirred at 50° C. for another 10 minutes and then added to 150 mL of methanol. The precipitate was filtered off, washed with methanol, acetone, and dried.

Yield: 0.63 grams (99% based on silver content of 86% from TGA analysis).

Example 2

Silver acetate (0.84 grams, 5 mmol), oleic acid (2.12 grams, 7.5 mmol), and N,N-dibutylamine (2.59 grams, 20 mmol) were mixed in 20 mL toluene and stirred at 50° C. Phenylhydrazine (0.30 grams, 2.75 mmol) solution in toluene (5 mL) was added into the silver acetate solution drop-wise with vigorous stirring. The solution became a dark red-brown color. The solution was stirred at 50° C. for another 10 minutes and then added to 150 mL of methanol. The precipitate was filtered off, washed with methanol, acetone, and dried.

Yield: 0.64 grams (97% based on silver content of 82% from TGA analysis).

Example 3

Silver acetate (0.84 grams, 5 mmol), oleic acid (2.12 grams, 7.5 mmol), and N,N,N'N'-tetramethylethylenediamine (TMEDA) (2.32 grams, 20 mmol) were mixed in 20 mL heptane and stirred at 50° C. until all solids dissolved (within 5 minutes). Phenylhydrazine (0.30 grams, 2.75 mmol) solution in toluene (5 mL) was added into the silver acetate solution drop-wise with vigorous stirring. The solution became a dark red-brown color. The solution was stirred at 50° C. for another 10 minutes and then added to 150 mL of methanol. The precipitate was filtered off, washed with methanol, acetone, and dried.

Yield: 0.61 grams (96% based on silver content of 85% from TGA analysis).

Example 4

Silver oxide (0.58 grams, 2.5 mmol), oleic acid (2.12 grams, 7.5 mmol), and TMEDA (2.32 grams, 20 mmol) were mixed in 20 mL heptane and stirred at 50° C. until all solids dissolved (within 10 minutes). Phenylhydrazine (0.30 grams, 2.75 mmol) solution in toluene (5 mL) was added into the silver acetate solution drop-wise with vigorous stirring. The solution became a dark red-brown color. The solution was stirred at 50° C. for another 10 minutes and then added to 150 mL of methanol. The precipitate was filtered off, washed with methanol, acetone, and dried.

Yield: 0.63 grams (91% based on silver content of 78% from TGA analysis).

Comparative Example

Two-Step Synthesis for Acid-Stabilized Silver Nanoparticles:

a. Synthesis of Oleylamine-Stabilized Silver Nanoparticles

Silver acetate (3.34 grams, 20 mmol) and oleylamine (13.4 grams, 50 mmol) were dissolved in 40 mL toluene and stirred at 55° C. for 5 min. Phenylhydrazine (1.19 grams, 11 mmol) solution in toluene (10 mL) was added into above solution drop-wise with vigorous stirring. The solution became a dark red-brown color. The solution was stirred at 55° C. for another 10 minutes, then added drop-wise to a mixture of acetone/methanol (150 mL/150 mL). The precipitate was filtered and washed briefly with acetone and methanol. A gray solid was obtained.

b. Synthesis of Oleic Acid-Stabilized Silver Nanoparticles.

The amine-stabilized silver nanoparticles prepared above were dissolved in 50 mL of hexane, which was added drop-wise to a solution of oleic acid (14.12 grams, 50 mmol) in hexane (50 mL) at room temperature. After 30 minutes, hexane was removed and the residue was poured into a stirring methanol (200 mL). After filtration, washing with methanol, and drying (in vacuo), a gray solid was obtained.

Yield: 3.05 grams (96%, based on Silver content of 68% from TGA analysis).

Results

The particle sizes and polydispersity index (PDI) of the silver nanoparticles were measured using a 0.1 wt % heptane solution of silver nanoparticles on a Zetasizer.

The conductivity of films made from the silver nanoparticles was also measured. A silver nanoparticle solution (15 wt %) in heptane was filtered using a 0.2 micron filter and then spin-coated on a glass substrate at a speed of 1000 rpm for 120 seconds. The substrate, with a thin layer of dark brown silver nanoparticles, was heated at 210° C. on a hotplate in air for 30 minutes to obtain a shiny thin silver film. The conductivity of the silver thin films was measured using a conventional four-probe technique.

The results are shown in Table 1.

TABLE 1

| Example | Particle size (nm)[a] | Conductivity ($\times 10^4$ S/cm) |
| --- | --- | --- |
| 1 | 11.3 | 1.0 |
| 2 | 14.4 | 2.9 |
| 3 | 13.4 | 1.6 |
| 4 | 9.29 | 2.7 |
| Comparative | 12.7 | 2.8 |

[a]Particle size includes stabilizer.

Figure 5:
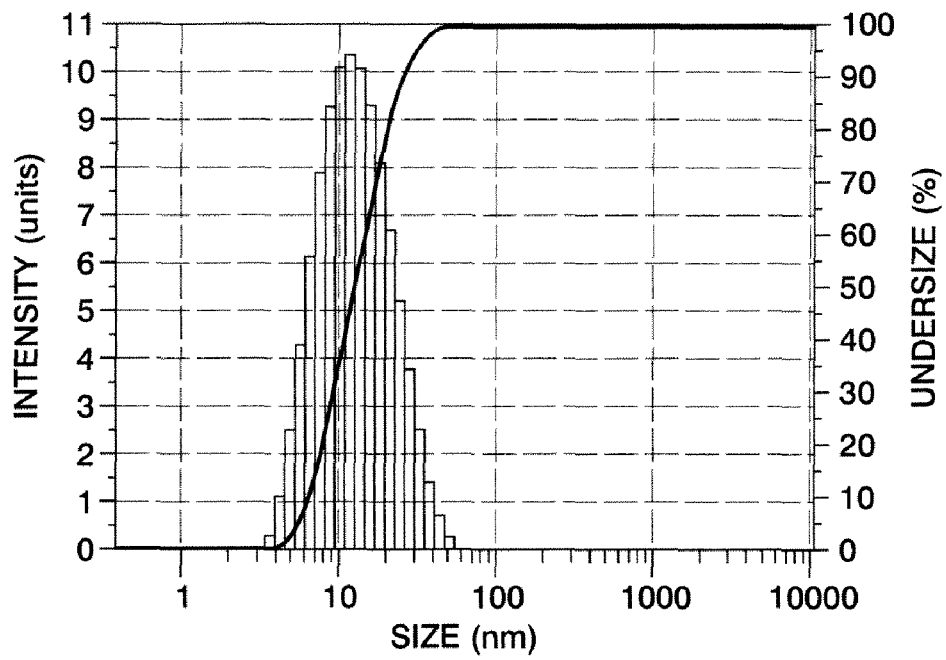
FIG. 5 is a graph showing the particle sizes and distributions of nanoparticles formed according to methods of the present disclosure.

FIG. 5 is a graph showing the particle sizes and distribution formed by Example 1.

Figure 6:
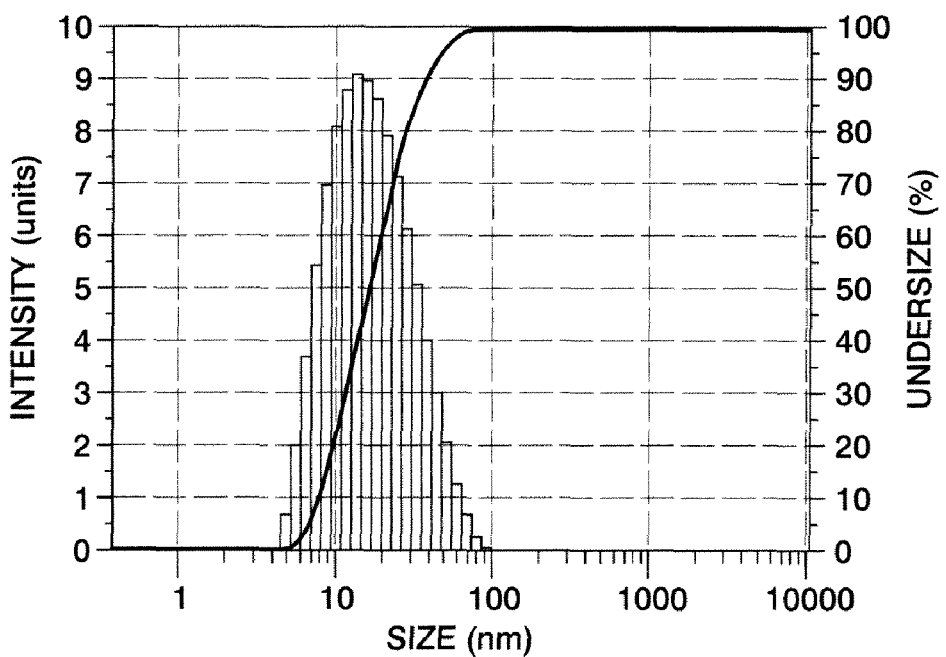
FIG. 6 is a graph showing the particle sizes and distributions of nanoparticles formed according to methods of the present disclosure.

FIG. 6 is a graph showing the particle sizes and distribution formed by Example 2.

Figure 7:
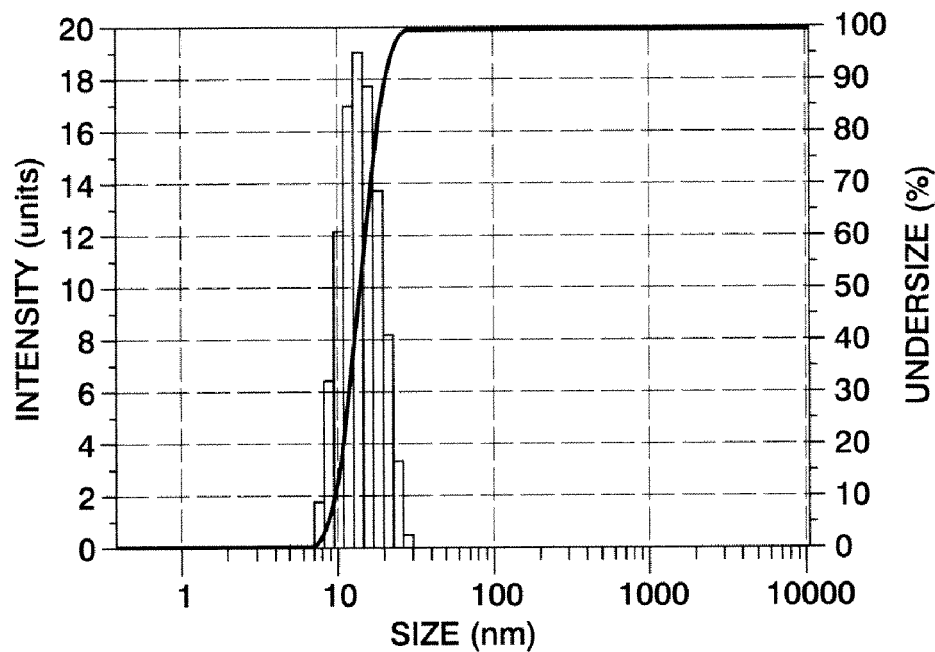
FIG. 7 is a graph showing the particle sizes and distributions of nanoparticles formed according to methods of the present disclosure.

FIG. 7 is a graph showing the particle sizes and distribution formed by Example 3.

Figure 8:
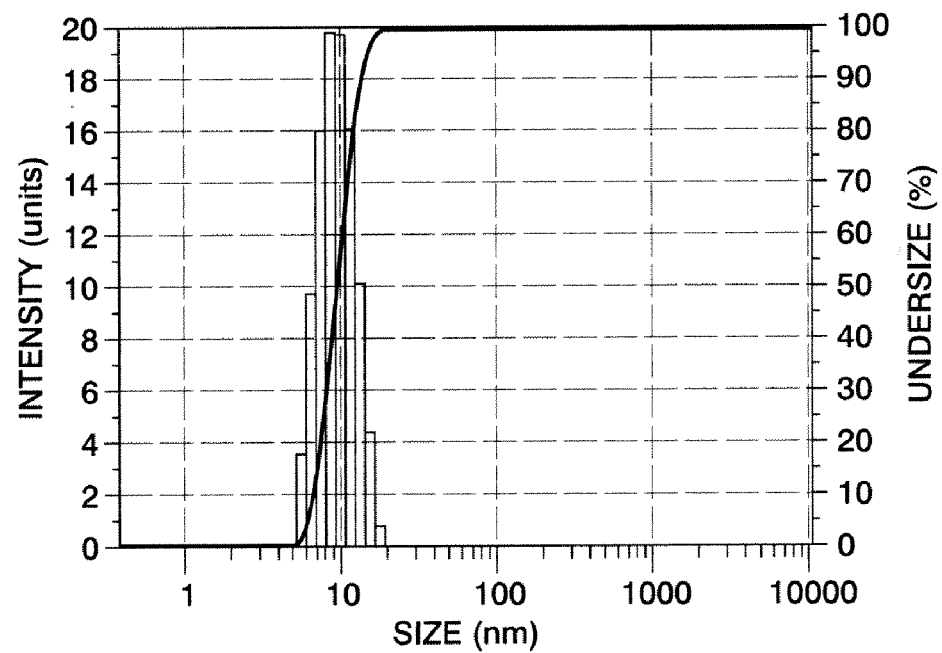
FIG. 8 is a graph showing the particle sizes and distributions of nanoparticles formed according to methods of the present disclosure.

FIG. 8 is a graph showing the particle sizes and distribution formed by Example 4.

Figure 9:
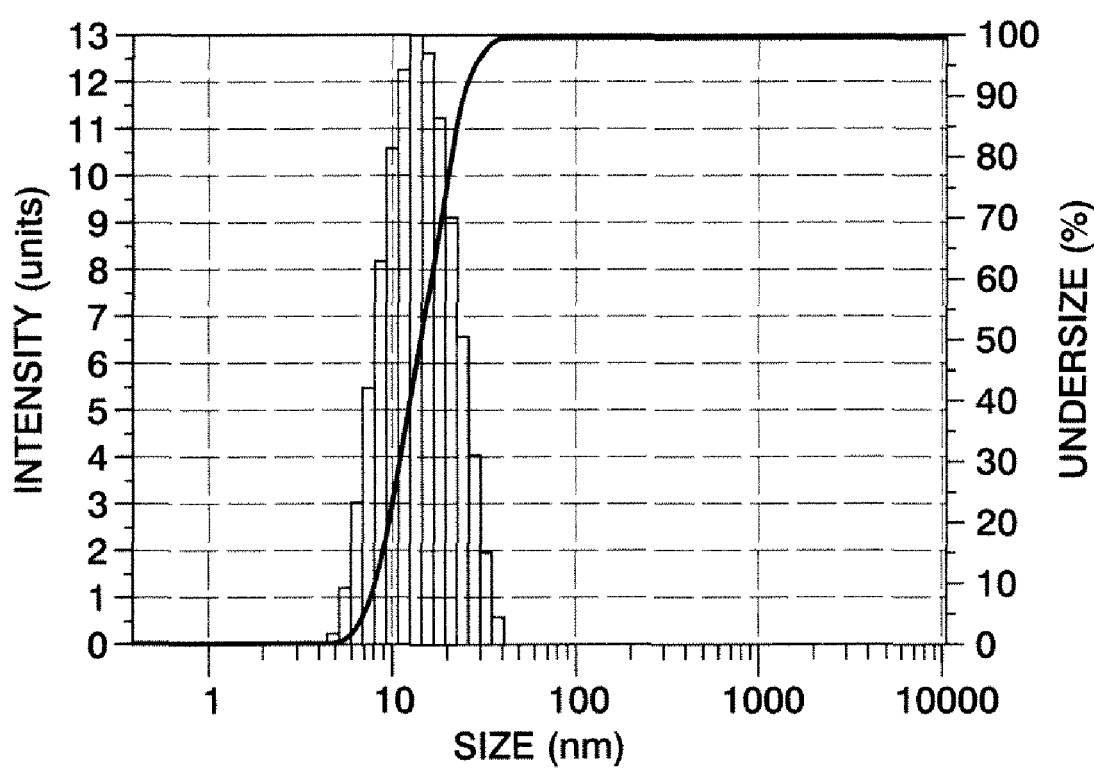
FIG. 9 is a graph showing the particle sizes and distributions of nanoparticles formed according to a prior method.

FIG. 9 is a graph showing the particle sizes and distribution formed by the Comparative Example.

In the graphs, the intensity referred to the strength of the signal and corresponded to the relative amount of nanoparticles at the given particle size. The undersize percentage (on the right hand of the graph) referred to the total percentage of nanoparticles having a particle size below the given particle size. Generally, the silver nanoparticles prepared by the instant processes in Examples 1 and 2 had a similar particle size and distribution to the Comparative Example. However, the use of TMEDA as a complexing agent produced silver nanoparticles with a much narrower particle distribution (see Examples 3 and 4). The conductivity range of $1.0 \times 10^4$ to $2.9 \times 10^4$ S/cm was similar to that of the Comparative Example.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process for producing silver nanoparticles, comprising:
   forming a mixture comprising a silver compound, a carboxylic acid, an amine complexing agent, and an optional solvent;
   heating the mixture;
   adding a hydrazine compound to the heated mixture; and
   reacting the mixture at a temperature of from 50° C. to 100° C. to form silver nanoparticles having a particle size distribution width of from about 10 nanometers to about 30 nanometers.

2. The process of claim 1, wherein the silver compound is selected from the group consisting of silver (I) oxide, silver (II) oxide, silver acetate, silver nitrate, silver acetylacetonate, silver benzoate, silver bromate, silver bromide, silver carbonate, silver chloride, silver citrate, silver fluoride, silver iodate, silver iodide, silver lactate, silver nitrite, silver perchlorate, silver phosphate, silver sulfate, silver sulfide, and silver trifluoroacetate.

3. The process of claim 1, wherein the carboxylic acid has at least 4 carbon atoms.

4. The process of claim 1, wherein the carboxylic acid has from 4 to about 20 carbon atoms.

5. The process of claim 1, wherein the carboxylic acid is selected from the group consisting of butyric acid, pentanoic acid, hexanoic acid, heptanoic acid, octanoic acid, nonanoic acid, decanoic acid, undecanoic acid, dodecanoic acid, tridecanoic acid, myristic acid, pentadecanoic acid, palmitic acid, heptadecanoic acid, stearic acid, oleic acid, nonadecanoic acid, icosanoic acid, eicosenoic acid, elaidic acid, linoleic acid, and palmitoleic acid.

6. The process of claim 1, wherein the amine complexing agent contains one, two, or more amine groups of:

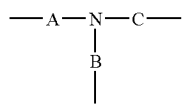

wherein A, B, and C are independently selected from hydrogen and an organic group, and at least one is an organic group.

7. The process of claim 1, wherein the amine complexing agent is of one the formulas:

wherein $R^1$, $R^2$, $R^3$, $R^4$, and $R^5$ are independently selected from hydrogen, alkyl, aryl, substituted alkyl, and substituted aryl; wherein at least one of $R^1$, $R^2$, and $R^3$ is not hydrogen; and $R^5$ cannot be hydrogen.

8. The process of claim 1, wherein the amine complexing agent is selected from the group consisting of propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, methylpropylamine, ethylpropylamine, propylbutylamine, ethylbutylamine, ethylpentylamine, propylpentylamine, butylpentylamine, triethylamine, tripropylamine, tributylamine, tripentylamine, trihexylamine, triheptylamine, trioctylamine, 1,2-ethylenediamine, N,N,N',N'-tetramethylethylenediamine, propane-1,3-diamine, N,N,N',N'-tetramethylpropane-1,3-diamine, butane-1,4-diamine, and N,N,N',N'-tetramethylbutane-1,4-diamine.

9. The process of claim 1, wherein the hydrazine compound is of the formula:

wherein $R^6$, $R^7$, $R^8$ and $R^9$ are independently selected from hydrogen, alkyl, and aryl; and wherein at least one of $R^6$, $R^7$, $R^8$ and $R^9$ is not hydrogen.

10. The process of claim 9, wherein the hydrazine compound is of the formula $R^6R^7N$—$NH_2$.

11. The process of claim 9, wherein the hydrazine compound is phenylhydrazine.

12. The process of claim 1, wherein the molar ratio of carboxylic acid to silver compound is from about 0.05 to about 10.

13. The process of claim 1, wherein the molar ratio of amine compound to silver compound is from about 0.1 to about 1000.

14. The process of claim 1, wherein the molar ratio of hydrazine compound to silver compound is from about 0.2 to about 2.0.

15. The process of claim 1, wherein the mixture is heated at a temperature of from about 25° C. to about 200° C.

16. The process of claim 1, wherein the mixture is heated for a period of from about 1 minute to about 120 minutes.

17. The process of claim 1, wherein the mixture is reacted for a period of from about 5 minutes to about 5 hours.

18. The process of claim 1, wherein the resulting nanoparticles have an average diameter of from about 0.5 nanometers to about 1000 nanometers.

19. The process of claim 1, further comprising the steps of:
   separating the silver nanoparticles from the mixture with a first non-solvent; and
   washing the silver nanoparticles with a second non-solvent.

20. The process of claim 19, wherein the first and second non-solvents independently comprise methanol, ethanol, propanol, isopropanol, acetone, acetonitrile, N,N-dimethylformamide, or dimethyl sulfoxide.

21. A process for producing silver nanoparticles with a narrow particle size distribution width, comprising:

forming a mixture comprising a silver compound, a carboxylic acid, a chelating diamine compound, and an optional solvent;
optionally heating the mixture;
adding a hydrazine compound to the mixture; and
reacting the mixture at a temperature of from 50° C. to 100° C. for a period of from about 5 minutes to about 5 hours to form silver nanoparticles;
wherein the silver nanoparticles have an average diameter of from about 1 to about 50 nanometers and a particle size distribution width of from about 10 nanometers to about 25 nanometers.

22. The process of claim 21, wherein the chelating diamine compound is of the formula:

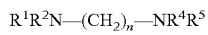

$R^1R^2N-(CH_2)_n-NR^4R^5$ wherein $R^1$, $R^2$, $R^4$, and $R^5$ are independently selected from hydrogen, alkyl, aryl, substituted alkyl, and substituted aryl; and n is from 1 to 4.

23. The process of claim 22, wherein the chelating diamine compound is N,N,N'N'-tetramethylethylenediamine.

24. A process for producing silver nanoparticles, comprising:
forming a mixture comprising a silver compound, a carboxylic acid, a chelating diamine compound, and an optional solvent;
heating the mixture;
adding a hydrazine compound to the heated mixture; and
reacting the mixture at a temperature of from 50° C. to 100° C. to form silver nanoparticles.

* * * * *